US005106522A

United States Patent [19]

Stangroom et al.

[11] Patent Number: 5,106,522

[45] Date of Patent: Apr. 21, 1992

[54] FLUID COMPOSITIONS

[75] Inventors: James E. Stangroom; Ian Harness, both of Sheffield, England

[73] Assignee: National Research Development Corporation, England

[21] Appl. No.: 514,671

[22] Filed: Apr. 25, 1990

Related U.S. Application Data

[63] Continuation of Ser. No. 912,772, Sep. 26, 1986, abandoned, which is a continuation of Ser. No. 695,171, Jan. 25, 1985, abandoned.

[30] Foreign Application Priority Data

Jan. 26, 1984 [GB] United Kingdom ................ 8402068

[51] Int. Cl.[5] .......................... C09K 3/00; H01B 3/20; C10M 105/18

[52] U.S. Cl. ........................................ 252/73; 252/74; 252/75; 252/78.1; 252/78.3; 252/573; 252/574; 252/580; 252/581

[58] Field of Search ....................... 252/71, 73, 74, 75, 252/77, 78.3, 570, 573, 574, 580, 581

[56] References Cited

U.S. PATENT DOCUMENTS 2,417,850 3/1947 Winslow ............................ 252/572
3,745,432 7/1973 Munch et al. ...................... 252/580

FOREIGN PATENT DOCUMENTS

82/04442 12/1982 PCT Int'l Appl. .

*Primary Examiner*—Paul Lieberman
*Assistant Examiner*—Christine A. Skane
*Attorney, Agent, or Firm*—Rosenman & Colin

[57] ABSTRACT

An electro-rheological fluid which comprises a solid particulate substance contained in a hydrophobic vehicle which is liquid at atmospheric pressure at least at temperatures below 50° C. and which comprises a compound of the formula:

$$(X)_n\text{—Ar}[Q\text{—}Z]_p$$

wherein:

Ar represents an aromatic nucleus;

Q represents an oxygen or a sulphur atom, or a group of the formula $CY_1Y_2$, SO, $SO_2$, $SiF_2$, $—OSi(Y_1Y_2)O—$ in which $Y_1$ and $Y_2$, which may be the same or different, each represents a halogen or a fluorine atom or an alkyl group;

X represents a halogen atom, or a nitro group, a thio(-substituted or unsubstituted hydrocarbyl) group or a substituted or unsubstituted hydrocarbyl group;

Z represents a substituted or unsubstituted aliphatic or alicyclic group; and n and p, which may be the same or different, each represent a number of at least 1, (n+p) not being greater than the total number of substituted sites on the aromatic nucleus, with the proviso that, where n is greater than 1, not all the n X groups need be the same and that the, or at least one of the, X group(s) represents a halogen atom; and that, where p is greater than 1, not all the pQ groups nor the pZ groups need to be the same.

42 Claims, 1 Drawing Sheet

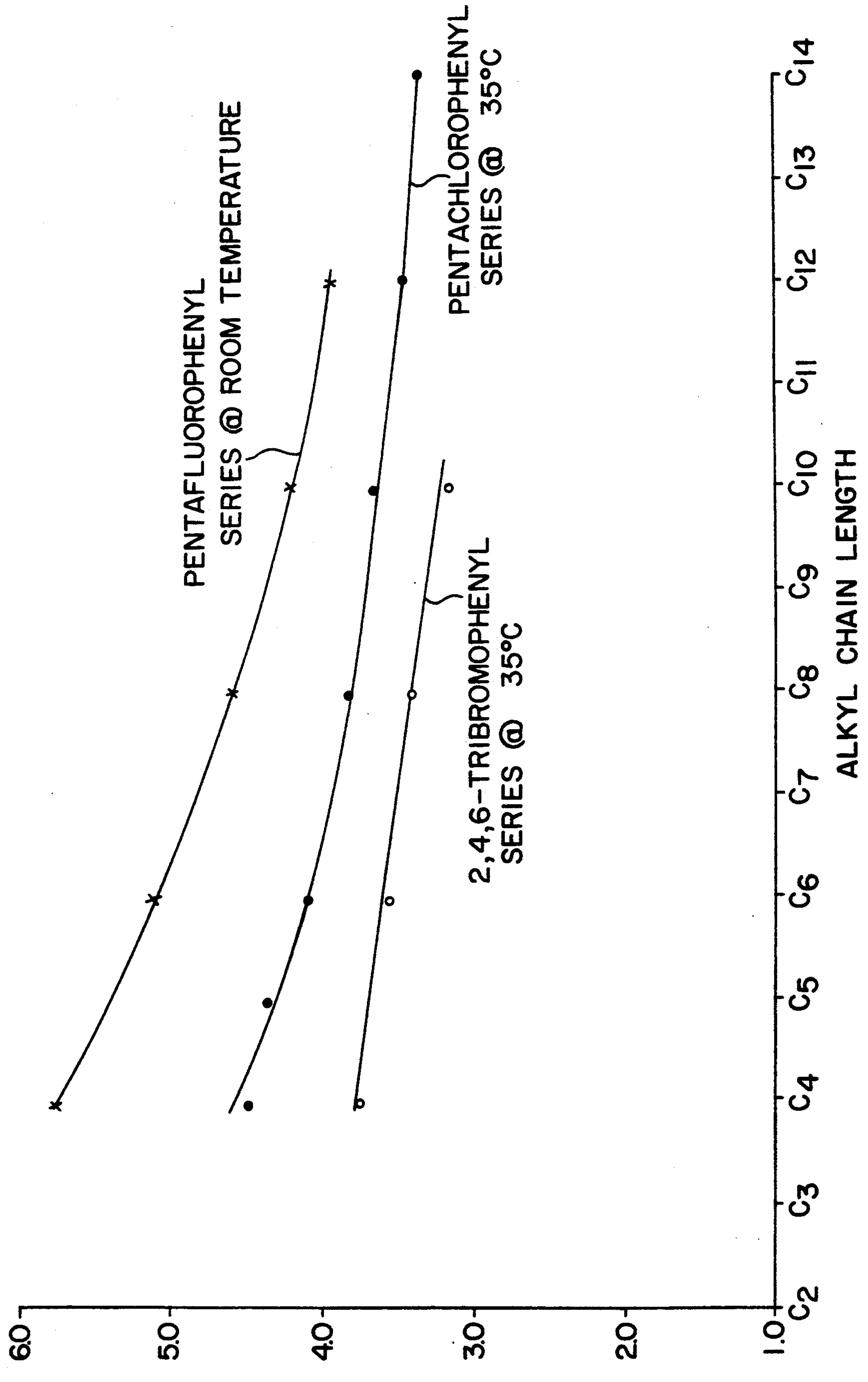
PENTAFLUOROPHENYL SERIES @ ROOM TEMPERATURE
PENTACHLOROPHENYL SERIES @ 35°C
2,4,6-TRIBROMOPHENYL SERIES @ 35°C
6.0
5.0
4.0
3.0
2.0
1.0
$C_2$
$C_3$
$C_4$
$C_5$
$C_6$
$C_7$
$C_8$
$C_9$
$C_{10}$
$C_{11}$
$C_{12}$
$C_{13}$
$C_{14}$
ALKYL CHAIN LENGTH

FLUID COMPOSITIONS

CROSS-REFERENCE

This is a continuation of Ser. No. 912,772 filed Sep. 26, 1986, now abandoned, which is a continuation of Ser. No. 695,171 filed Jan. 25, 1985 now abandoned.

This invention relates to fluid compositions; more particularly, this invention relates to fluid compositions which are electro-rheological (ER) fluids, previously known as electro-viscous fluid; and to processes for preparing such electro-rheological fluids.

U.S. Pat. No. 2,417,850 (Winslow) discloses that certain suspensions, composed of a finely divided solid such as starch, limestone or its derivatives, gypsum, flour, gelatin or carbon, dispersed in a non-conducting liquid, for example lightweight transformer oil, transformer insulating fluids, olive oil or mineral oil, will manifest an increase in flow resistance as long as an electrical potential difference is applied thereto. This effect is sometimes termed the Winslow Effect. The increase in flow resistance resulting from the application of an electric field was originally interpreted as an increase in viscosity, and the materials showing this effect were termed 'Electroviscous Fluids'. However, subsequent investigations have shown that the increase in flow resistance is not due to an increase in viscosity, in the Newtonian sense; suspensions exhibiting the Winslow Effect are now referred to as 'Electro-Rheological Fluids'.

Research has been effected to improve the finely divided solid used in ER fluids; UK Patents Nos. 1501635 and 1570234 disclose improved materials which are hydrophilic and porous, and comprise some ionizable groups. It is believed that the Winslow Effect occurs because water, normally within the bulk of each particle, is driven to the surface by a process of electro-osmosis when an electric field is applied; at the surface the water can form bonds with neighbouring particles thus building up an array of linked particles which resists deformation.

Comparatively little research, however, appears to have been effected in relation to the liquid component of ER fluids.

Desirable properties of such electric insulating liquids are:

1. high boiling point and low freezing point, giving the ER fluid a wide temperature range (ideally from below −40° C. to above at least 200° C.), and low vapour pressure at normal working temperatures;
2. low viscosity, so that either the final ER fluid has a low no-field viscosity or, alternatively, so that a greater proportion of solid can be included in the final ER fluid without the no-field viscosity becoming excessive, thus enhancing the Winslow Effect;
3. high electrical resistance and high dielectric strength, so that the final ER fluid draws little current and may be used over a wide range of applied field strengths;
4. high density (generally greater than 1.2 g $cm^{-3}$ and typically in the range 1.3-1.6 g $cm^{-3}$) since it is preferable for the solid and liquid components of an ER fluid to have the same density to prevent settling on standing;
5. chemical stability, to prevent degradation in storage and service, even in the presence of the many potentially catalystic surfaces provided by the particles in an ER fluid, which could give rise to deleterious breakdown products;
6. marked hydrophobic character, since if the liquid is at all hydrophilic it will dissolve the water, on which the Winslow Effect apparently depends, from the solid;
7. low toxicity combined with bio-degradibility;
8. high flash-point, and
9. relatively low cost.

In addition to the above requirements there are other, more subtle physico-chemical features involved in determining whether a given liquid is suitable for use in ER fluids. Synergistic effects occur; for example, it has been observed that two liquids may each separately give a good ER fluid in combination with a given solid, but a mixture of these two liquids with the same solid does not give an active ER fluid. These effects are not well understood.

In practice, it is difficult to combine high boiling point, low freezing point, high density and marked hydrophobic character in a single chemical substance.

This invention seeks to provide an improved hydrophobic vehicle which is suitable for use in ER fluids.

According to the present invention there is provided an electro-rheological fluid which comprises a solid particulate substance contained in a hydrophobic vehicle which is liquid at atmospheric pressure, at least at temperatures below 50° C. and which comprises a compound of the formula:

$$(X)_n—Ar—[Q—Z]_p$$

wherein:

Ar represents an aromatic nucleus;

Q represents an oxygen or a sulphur atom, or a group of the formula $>CY_1Y_2$, $>SO$, $>SO_2$, $>SiF_2$, $OSi(Y_1Y_2)O—$ in which $Y_1$ and $Y_2$, which may be the same or different, each represent a hydrogen or a fluorine atom or an alkyl group;

X represents a halogen atom, or a nitro group, a thio(-substituted or unsubstituted hydrocarbyl) group or a substituted or unsubstituted hydrocarbyl group;

Z represents a substituted or unsubstituted aliphatic or alicyclic group; and n and p, which may be the same or different each represent a number of at least 1, (n+p) not being greater than the total number of substituted sites on the aromatic nucleus, with the proviso that, where it is greater than 1, not all the n X groups need be the same and that the, or at least one of the, X group(s) represents a halogen atom; and that, where p is greater than 1, not all the pQ groups in all the pZ groups need be the same.

Preferably Ar represents a carbocyclic, desirably a monocyclic, aromatic nucleus: if one or more hetero atoms are present this may make the or each halogen atom substituent X undesirably reactive; if the ring system becomes unduly large this can give the resulting compound a freezing point which is undesirably high. It is a particularly preferred that Ar represents a benzene ring substituted by the (n+p) substituent atoms or groups.

Desirably Q represents an oxygen or sulphur atom or a group of the formula $>CY_1Y_2$ in which $Y_1$ and $Y_2$ which may be the same or different, each represent a hydrogen atom or an alkyl group, preferably a $C_1$ to $C_5$ alkyl group. It is particularly preferred that Q represents an oxygen atom: such compounds are comparatively readily synthesised and purified.

It is preferred that X represents a halogen atom, preferably a fluorine, chlorine or bromine atom, especially a bromine atom: iodine atoms tend to be too readily eliminated.

It is desirable that n represents a number greater than 1, preferably a number from 3 to 5. Where n represents a number greater than 1 each X substituent preferably represents a halogen atom and it is particularly preferred that the n halogen atoms are identical. Particularly preferred $(X)_nAr$ moities are polyhalogenated benzene rings especially the pentachlorophenyl, pentafluorophenyl and sym-tribromophenyl moities. Such compounds are found to have the requisite density for use in formulating ER fluids.

Z suitably represents an aliphatic group, preferably an alkyl group. It is desirable that Z does not contain any substitution which would be reactive in an ER fluid in service; it is particularly preferred that Z represents an unsubstituted alkyl group. Particularly promising compounds are those wherein Z represents an unsubstituted $C_3$ to $C_5$, preferably $C_5$ to $C_{12}$, alkyl group.

The compounds used in the present invention may be prepared by analogy with conventional synthetic methods; for example those compounds wherein Q represents an oxygen or sulphur atom may be prepared by reacting a compound of the formula:

$$(X)_n\text{—Ar}[Q\text{—}M^+]_p$$

wherein:

X, Ar, n and p are as herein defined;

Q represents an oxygen or sulphur atom; and

M represents an alkali metal with a compound of the formula:

$$Z\text{—}X^1$$

wherein:

Z is as herein defined; and $X^1$ represents a halogen atom at an elevated temperature, for example from 80° C. to 120° C., so that the reaction medium refluxes at ambient pressure.

Specific such compounds of promise for use in the present invention include polyhalophenyl alkyl ethers, such as pentachlorophenyl $C_3$ to $C_{15}$ ethers; for example pentachlorophenyl n-butyl ether, pentachlorophenyl iso-butyl ether, pentachlorophenyl n-pentyl ether, pentachlorophenyl iso-pentyl ether, pentachlorophenyl n-hexyl ether, pentachlorophenyl n-octyl ether, pentachlorophenyl n-decyl ether, pentachlorophenyl lauryl ether, pentachlorophenyl myristyl ether, pentafluorophenyl $C_3$ to $C_{15}$ alkyl ethers, for example pentafluorophenyl n-butyl ether, pentafluorophenyl n-hexyl ether, pentafluorophenyl n-octyl ether, pentafluorophenyl n-decyl ether, and pentafluorophenyl lauryl ether; tribromophenyl $C_3$ to $C_{15}$ alkyl ethers, such as 2,4,6-tribromophenyl $C_3$ to $C_{15}$ alkyl ether; for example tribromophenyl n-butyl ether, tribromophenyl n-hexyl ether, tribromophenyl n-octyl ether, and tribromophenyl n-decyl ether, To obtain optimum properties from the resulting ER fluid it is often desirable to form a mixture of a hydrophobic vehicle as hereinabove defined with at least one other electrical insulator. The, or at least one of the, other electrical insulator(s) may have the formula hereinabove defined or may comprise a mineral or vegetable oil, a liquid fluoropolymer, a polychlorinated biphenyl, or a compound of the formula:

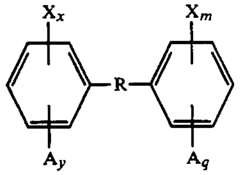

wherein:

R represents $CY_2$, O, S, SO, $SO_2$, $SiF_2$ or O $Si(Y_2)O$;

X represents a halogen atom;

A represents an alkyl group;

Y represents a hydrogen or fluorine atom or an alkyl group;

x and m represent average values such that (x+m) is from 1 to 3; and y and q represent average values such that (y+q) is from 0 to 2, with the provisos that neither all the x halogen atoms nor all the m halogen atoms need be the same; and that neither all the y alkyl groups nor all the q alkyl groups need be the same, preferably a halo-substituted diphenylmethane, especially bromodiphenyl methane.

The hydrophobic vehicles according to this invention are preferably liquid, at atmospheric pressure, at temperatures below 20° C., especially at temperatures below −10° C. or lower. Desirably, they are also liquid at temperatures above 100° C., especially at temperatures above 150° C. or higher. The electric insulators according to this invention preferably have a high density; for example a density, at a temperature of 20° C., from 1.1 to 1.9 g $cm^{-3}$, especially from 1.3 to 1.6 g $cm^{-3}$.

The solid particulate substance is preferably hydrophilic and may comprise starch and/or silica gel. Preferably, however, the solid particulate substance comprises an organic polymer containing free or at least partially salified acid groups. The organic polymer may comprise a homo- or co-polymer of a monosaccharide. Preferably, however, the organic polymer comprises a phenolformaldehyde copolymer or a polymer of an acrylate or methacrylate salt.

In electro-rheological fluids of the present invention the volume fraction of the solid particulate substance is desirably from 25% to 50% by volume, preferably from 30% to 40% by volume. It is preferred that the particle size of the solid particulate substance is from $>1\ \mu$ to $>50\ \mu$.

The following Examples illustrate the invention.

EXAMPLE 1

Preparation of Pentachlorophenyl Hexyl Ether 170 g (0.6 mol) of sodium pentachlorophenate and 350 ml of absolute alcohol were placed in a liter conical flask. The reactants were stirred under reflux until dissolution was complete. The condenser was removed and 97 g (83 ml:0.6 mol) of 1-bromohexane were added. The mixture was then left refluxing for about 12 hours with the stirrer on maximum speed. Solid (NaBr) was gradually deposited and on allowing the flask to stand and cool three layers were formed: a lower solid layer, an oily middle layer (the product), and an upper layer of alcohol. The flask contents were next remixed and transfered as completely as possible to a liter round bottomed flask. The alcohol was removed on a rotovap (60° C. and 100 mm), and then the flask was cooled to room temperature. 500 ml of light petrol (40/60) were added, the flask was stoppered, and then shaken vigorously for a few seconds. The pressure was next cautiously released, and the process was repeated until all the solid was in free suspension. The mixture was then rapidly filtered at the pump, then the dark brown liquid was transfered to a column of alumina (about 8"×1"). It was found that a few yellow bands moved quickly down the column. These were collected in the same receiver as the bulk of the sample—the dark colouration will collect on the top 1" of the column. A small amount of petrol was then added to wash through the column.

The petrol was then carefully diluted and the non-volatile orange liquid was transferred to a 250 ml round bottomed flask. A vacuum distillation with an air condenser and a "pig" was carried out and the fraction boiling at 170° C. at 0.75 mm Hg was collected. The density of resulting oil was about 1.38 g/ml, it froze at 18° C. and boiled at 380° C.

EXAMPLES 2 TO 9

In essentially the same manner the following pentachlorophenyl ethers were prepared:

| EXAMPLE | Z substituent | Freezing point (°C.) | Boiling point (°C.) (atmos) | density g $cm^{-3}$ |
|---|---|---|---|---|
| 2 | n-butyl | 21.5 | 340 | 1.48 |
| 3 | iso-butyl | 27.0 | 335 | 1.48 |
| 4 | n-pentyl | 23.0 | 350 | 1.42 |
| 5 | iso-pentyl | 16.0 | 345 | 1.42 |
| 6 | n-octyl | 7.0 | 400 | 1.31 |
| 7 | n-decyl | 23.0 | 420 | 1.26 |
| 8 | lauryl | 27.5 | 450 | 1.22[1] |
| 9 | myristyl | 30.0 | — | 1.19[1] |

[1]extrapolated values

EXAMPLES 10 TO 13

The following 2,4,6-tribromophenyl ethers were prepared:

| EXAMPLE | Z substituent | Freezing point (°C.) | Boiling point (°C.) (atmos) | density g $cm^{-3}$ |
|---|---|---|---|---|
| 10 | n-butyl | 13.0 | 340 | 1.87 |
| 11 | hexyl | 15.0 | 360 | 1.71 |
| 12 | octyl | 18.5 | 390 | 1.60 |
| 13 | decyl | 30.5 | 410 | 1.52 |

EXAMPLES 14 TO 18

The following pentafluorophenyl ethers were prepared:

| EXAMPLE[1] | Z substituent | boiling point (°C.) (atmos) | density g $cm^{-3}$ |
|---|---|---|---|
| 14 | n-butyl | 190 | 1.30 |
| 15 | hexyl | 230 | 1.22 |
| 16 | octyl | 260 | 1.17 |
| 17 | decyl | 290 | 1.12 |
| 18 | dodecyl | | 1.098 |

[1]all are colourless mobile liquids at room temperature.

EXAMPLES 19 TO 24

In these Examples, measurements of electro-rheological response of the pentachlorophenyl ethers were carried out at zero shear using the test rig described in UK Patent No. 1,501,635 with an electrode gap of 0.5 mm and an electrode area of 78 $cm^2$. The standard solid was a lithium polymethacrylate resin as disclosed in GB Patents 1501635 and 1570234. Results are shown in Table 1.

TABLE 1

| EXAMPLE | Ether from Example[1] | $\frac{S^2}{V}$ Pa mm $V^{-1}$ | $V_o$ kV $mm^{-1}$ | P nA/Vm | Q $fAV^2$ |
|---|---|---|---|---|---|
| 19 | 2 | 1.80 ± 0.16 | 1.37 ± 0.26 | −1.6 ± 3.3 | 15.00 ± 1.37 |
| 20 | 1 | 1.55 ± 0.07 | 0.59 ± 0.12 | −3.2 ± 1.3 | 10.30 ± 0.54 |
| 21 | 6 | 1.45 ± 0.07 | 0.65 ± 0.14 | −2.2 ± 0.96 | 10.06 ± 0.39 |
| 22 | 7 | 1.81 ± 0.04 | 0.54 ± 0.06 | −1.9 ± 1.3 | 8.42 ± 0.57 |
| 23 | 8 | 1.73 ± 0.05 | 0.53 ± 0.08 | −1.6 ± 1.1 | 10.20 ± 0.43 |
| 24 | 9 | 1.59 ± 0.05 | 0.56 ± 0.09 | −0.46 ± 0.8 | 9.33 ± 0.36 |

[1]All tests were made at 30° C. using 30% volume fraction fluids.
[2]The notation is that used in GB Patent 1570234.

EXAMPLES 25 TO 32

In these Examples, measurements analogous to those made in Examples 19 to 24 were made. The standard solid was not necessarily of the same batch as previously used and, accordingly, the results presented here may not be directly comparable with those of the previous Examples. Results are shown in Table 2.

TABLE 2

| EXAMPLE | Ether from Example[1] | $\frac{S^2}{V}$ Pa mm $V^{-1}$ | $V_o$ kV $mm^{-1}$ | P nA/Vm | Q $fAV^2$ |
|---|---|---|---|---|---|
| 25 | 3 | 0.61 ± 0.22 | 1.508 ± 1.04 | 29.4 ± 3.7 | 9.29 ± 1.73 |
| 26 | 5 | 2.21 ± 0.14 | 0.614 ± 0.153 | −2.9 ± 1.52 | 10.40 ± 0.67 |
| 27 | 12 | 1.78 ± 0.14 | 0.518 ± 0.188 | −4.1 ± 3.1 | 25.24 ± 1.55 |
| 28 | 14 | 1.66 ± 0.08 | 0.733 ± 0.128 | −1.88 ± 0.77 | 7.78 ± 0.30 |
| 29 | 15 | 1.45 ± 0.07 | 0.731 ± 0.125 | 2.43 ± 0.80 | 7.09 ± 0.30 |
| 30 | 16 | 1.21 ± 0.10 | 1.370 ± 0.256 | 25.7 ± 3.4 | 6.18 ± 1.26 |
| 31 | 17 | 1.49 ± 0.13 | 0.892 ± 0.236 | 6.36 ± 0.67 | 7.04 ± 0.30 |
| 32 | 18 | 1.28 ± 0.08 | 0.715 ± 0.171 | 1.53 ± 0.82 | 6.58 ± 0.33 |

EXAMPLES 33 TO 36: COMPARATIVE EXAMPE 1

In these Examples the standard solid used was a cross-linked methacrylate (a suspension of the lithium methacrylate used previously but cross-linked with methylene bis-acrylamide). Results are shown in Table 3, together with those of a comparative example (using bromo diphenyl methane).

TABLE 3

| EXAMPLE | Ether from Example[1] | $\frac{S^2}{V}$ Pa mm $V^{-1}$ | $V_o$ kV $mm^{-1}$ | P nA/Vm | Q $fAV^2$ |
|---|---|---|---|---|---|
| 33 | 1 | 1.43 ± 0.08 | 1.025 ± 0.208 | 0.7 ± 0.04 | 0.26 ± 0.01 |
| 34 | 6 | 1.31 ± 0.08 | 1.087 ± 0.240 | 0.70 ± 0.04 | 0.26 ± 0.01 |
| 35 | 7 | 1.18 ± 0.150 | 0.747 ± 0.150 | 0.63 ± 0.04 | 0.34 ± 0.02 |
| 36 | 11 | 1.54 ± 0.10 | 0.9912 ± 0.221 | 0.72 ± 0.03 | 0.215 ± 0.01 |
| Comp. Ex. 1 | (bromodiphenyl methane) | 0.98 ± 0.06 | 1.116 ± 0.193 | 0.82 ± 0.05 | 0.46 ± 0.07 |

The invention is further described, by way of example with reference to the accompanying drawing to which the sole FIGURE represents the variation in dielectric constant (relative to air) with the 2-substituent alkyl group chain length for the above-exemplified classes of ether.

We claim:

1. In an electro-rheological fluid, the improvement which comprises incorporating an electro-rheological affecting amount of a hydrophobic vehicle suitable for use in rheological fluids, which vehicle is liquid at atmospheric pressure at least at temperatures below 50° C. and which comprises a compound of the formula:

$$(X)_n\text{—AR }[Q\text{—}Z]_p$$

wherein:

AR is a benzene ring;

Q is oxygen, sulphur, or a group of a formula $>CY_1Y_2$, $>SO$, $>SO_2$, $SiF_2$, $\text{—}OSi(Y_1Y_2)O\text{—}$ in which $Y_1$ and $Y_2$ are the same or different, and each is hydrogen or alkyl of 1 to 5 carbon atoms;

X is halo;

Z is alkyl of 3 to 15 carbon atoms; and n and p are the same or different, n is a number from 3 to 5, and p is a number of at least 1, not all the n X groups need be the same and not all the pQ groups nor all the pZ groups need be the same.

2. The improvement according to claim 1, wherein Q is oxygen.

3. The improvement according to claim 1, wherein X is chloro or bromo.

4. The improvement according to claim 1, wherein the n X groups are identical.

5. The improvement according to claim 1, wherein Z is alkyl of 3 to 5 carbon atoms.

6. The improvement according to claim 1, wherein Z is alkyl of 3 to 12 carbon atoms.

7. The improvement according to claim 1, wherein the ether is a polyhalophenyl alkyl ether.

8. The improvement according to claim 7, wherein the ether is a pentachlorophenyl alkyl ether of 3 to 15 carbon atoms in the alkyl ether moiety.

9. The improvement according to claim 8, wherein the ether is a pentachlorophenyl n-butyl ether.

10. The improvement according to claim 8, wherein the ether is a pentachlorophenyl iso-butyl ether.

11. The improvement according to claim 8, wherein the ether is a pentachlorophenyl n-pentyl ether.

12. The improvement according to claim 8, wherein the ether is a pentachlorophenyl iso-pentyl ether.

13. The improvement according to claim 8, wherein the ether is a pentachlorophenyl n-hexyl ether.

14. The improvement according to claim 8, wherein the ether is a pentachlorophenyl n-octyl ether.

15. The improvement according to claim 8, wherein the ether is a pentachlorophenyl n-decyl ether.

16. The improvement according to claim 8, wherein the ether is pentachlorophenyl lauryl ether.

17. The improvement according to claim 8, wherein the ether is pentachlorophenyl myristyl ether.

18. The improvement according to claim 7, wherein the ether is a tribromophenyl alkyl ether of 3 to 15 carbon atoms in the alkyl ether moiety.

19. The improvement according to claim 18, wherein the ether is 2,4,6-tribromophenyl alkyl ether.

20. The improvement according to claim 18, wherein the ether is tribromophenyl n-butyl ether.

21. The improvement according to claim 18, wherein the ether is tribromophenyl n-hexyl ether.

22. The improvement according to claim 18, wherein the ether is tribromophenyl n-octyl ether.

23. The improvement according to claim 18, wherein the ether is tribromophenyl n-decyl ether.

24. The improvement according to claim 1, wherein the hydrophobic vehicle comprises a mixture with at least one other electrical insulator wherein said vehicle contains a solid particulate substance.

25. The improvement according to claim 24, wherein the at least one other electrical insulator is a mineral oil, a vegetable oil, a liquid fluoropolymer, a polychlorinated biphenyl, or a compound of the formula:

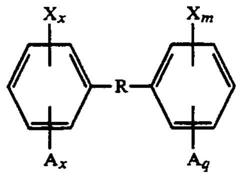

wherein:

R is $CY_2$, O, S, SO, $SO_2$, $SiF_2$ or $OSi(Y_2)O$;

X is halo;

A is alkyl of 1 to 5 carbon atoms;

Y is hydrogen, fluoro, or alkyl of 1 to 5 carbon atoms;

x and m are average values such that (x+m) is from 1 to 3; and x and q are average values such that (x+q) are from 0 to 2, with the provisos that neither all the x halogen atoms nor all the m halogen atoms need be the same; and that neither all the x alkyl groups nor all the q alkyl groups need be the same.

26. The improvement according to claim 25, wherein the other electrical insulator is a halo-substituted diphenyl methane.

27. The improvement according to claim 26, wherein the other electrical insulator is bromodiphenyl methane.

28. The improvement according to claim 24, wherein the mixture is a solution.

29. The improvement according to claim 1, wherein the hydrophobic vehicle is liquid, at atmospheric pressure, at least at temperatures below 20° C.

30. The improvement according to claim 29, wherein the hydrophobic vehicle is liquid, at atmospheric pressure, at least at temperatures below −10° C.

31. The improvement according to claim 1, wherein the hydrophobic vehicle is liquid, at atmospheric pressure, at least at temperatures above 100° C.

32. The improvement according to claim 31, wherein the hydrophobic vehicle is liquid, at atmospheric pressure, at least at temperatures above 150° C.

33. The improvement according to claim 1, wherein the hydrophobic vehicle has a density, at a temperature of 20° C., from 1.1 to 1.9 g $cm^{-3}$.

34. The improvement according to claim 33, wherein the hydrophobic vehicle has a density, at a temperature of 20° C., from 1.3 to 1.6 g $cm^{-3}$.

35. The improvement according to claim 24, wherein the solid particulate substance is hydrophilic.

36. The improvement according to claim 35, wherein the solid particulate substance is starch, silica gel or a mixture thereof.

37. The improvement according to claim 35, wherein the solid particulate substance is an organic polymer containing free or at least partially salified acid groups.

38. The improvement according to claim 37, wherein the organic polymer is a homo- or co-polymer of monosaccharide.

39. The improvement according to claim 38, wherein the organic polymer is a phenol-formaldehyde copolymer.

40. The improvement according to claim 24, wherein the volume fraction of the solid particulate substance is from 25% to 50% by volume.

41. The improvement according to claim 40, wherein the volume fraction is from 30% to 40% by volume.

42. The improvement according to claim 24, wherein the particle size of the solid particulate substance is from $>1\mu$ to $<50\mu$.

* * * * *